INVENTORS
JOHN J. PIERRO
LEWIS B. RUSSELL
BY Donald J. Ellingsberg

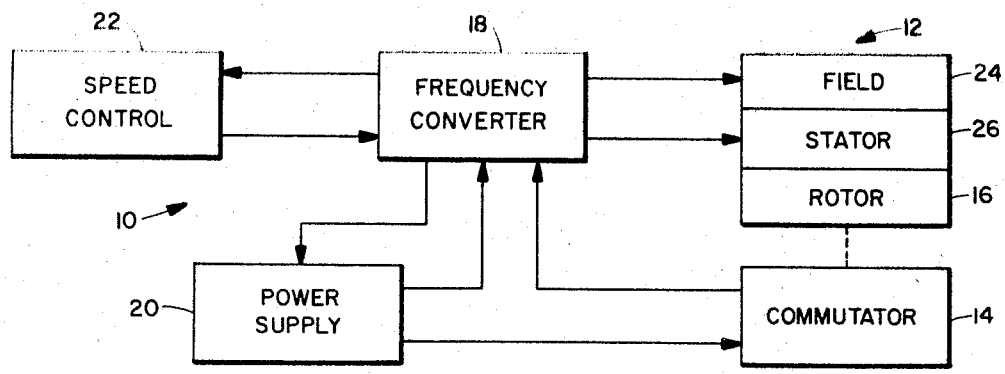
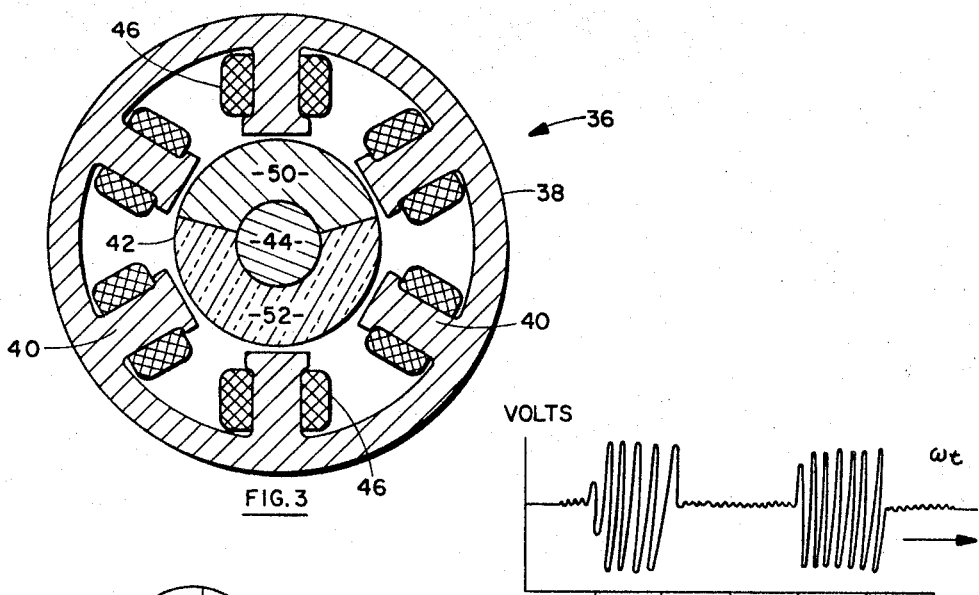

United States Patent Office 3,448,363
Patented June 3, 1969

3,448,363
SPEED CONTROL SYSTEM FOR A DYNAMO-
ELECTRIC MACHINE
John J. Pierro, Inglewood, and Lewis B. Russell,
Orange, Calif., assignors to North American
Rockwell Corporation
Filed Sept. 26, 1966, Ser. No. 581,991
Int. Cl. H02p 7/36
U.S. Cl. 318—197                              6 Claims

ABSTRACT OF THE DISCLOSURE

A speed control system for a dynamo-electric machine providing stepless speed control and selectively variable torque over the full speed range. A commutator senses the rotor speed and position and, in conjunction with a speed control input, varies the output of a frequency converter to the rotor and stator so that the stator travelling magnetic wave and the rotor field wave are stationary with respect to one another and separated by a selectively variable displacement angle.

---

The invention relates to a speed control system, and more particularly to a speed control system for dynamo-electric machines having a precisely variable output torque.

It is an object of the invention to provide a speed control system for a dynamo-electric machine.

It is also an object of the invention to provide a speed control system for a dynamo-electric machine that facilitates the development of variable torque over a wide speed range from zero to full speed.

A further object of the invention is to provide a speed control system to accurately control the output speed of a dynamo-electric machine over an entire speed range.

Another object of the invention is to provide a speed control system that permits changes in the speed of a dynamo-electric machine without step changes.

Yet another object of the invention is to provide a speed control system for a dynamo-electric machine that enables the development of a high starting torque at start conditions and essentially constant horsepower over the speed range.

It is also an object of the invention to provide a speed control system for a dynamo-electric machine that is highly efficient and highly reliable.

Briefly, in accordance with one form of the invention, a new and improved speed control system for a dynamo-electric machine is provided having a converter means responsive to an input speed control signal. A commutator means cooperates with the rotor of the dynamo-electric machine and generates an output signal that reflects the movement of the rotor. The converter means is responsive to the output signal from the commutator means and develops a field magnetic wave in the field windings of the dynamo-electric machine and a stator magnetic wave in the stator windings of the dynamo-electric machine. The field wave is separated from the stator wave by a predetermined and selectively variable displacement angle so that a regulated force is developed by the dynamo-electric machine.

Further objects, features and the attending advantages of the invention will become apparent when the following description is read in conjunction with the accompanying drawings in which:

FIGURE 1 is a simplified block diagram of the speed control system of the invention cooperating with a dynamo-electric machine;

FIGURE 3 is a sectional view of one form of electromagnetic commutator for the speed control system of FIGURE 2;

FIGURE 4 is a graphical representation of a pulse train developed by the commutator of FIGURE 3; and FIGURE 5 is a schematic representation of typical magnetic wave forms developed by the dynamo-electric machine of FIGURE 2 when controlled by the speed control system of the invention.

Figure 2:
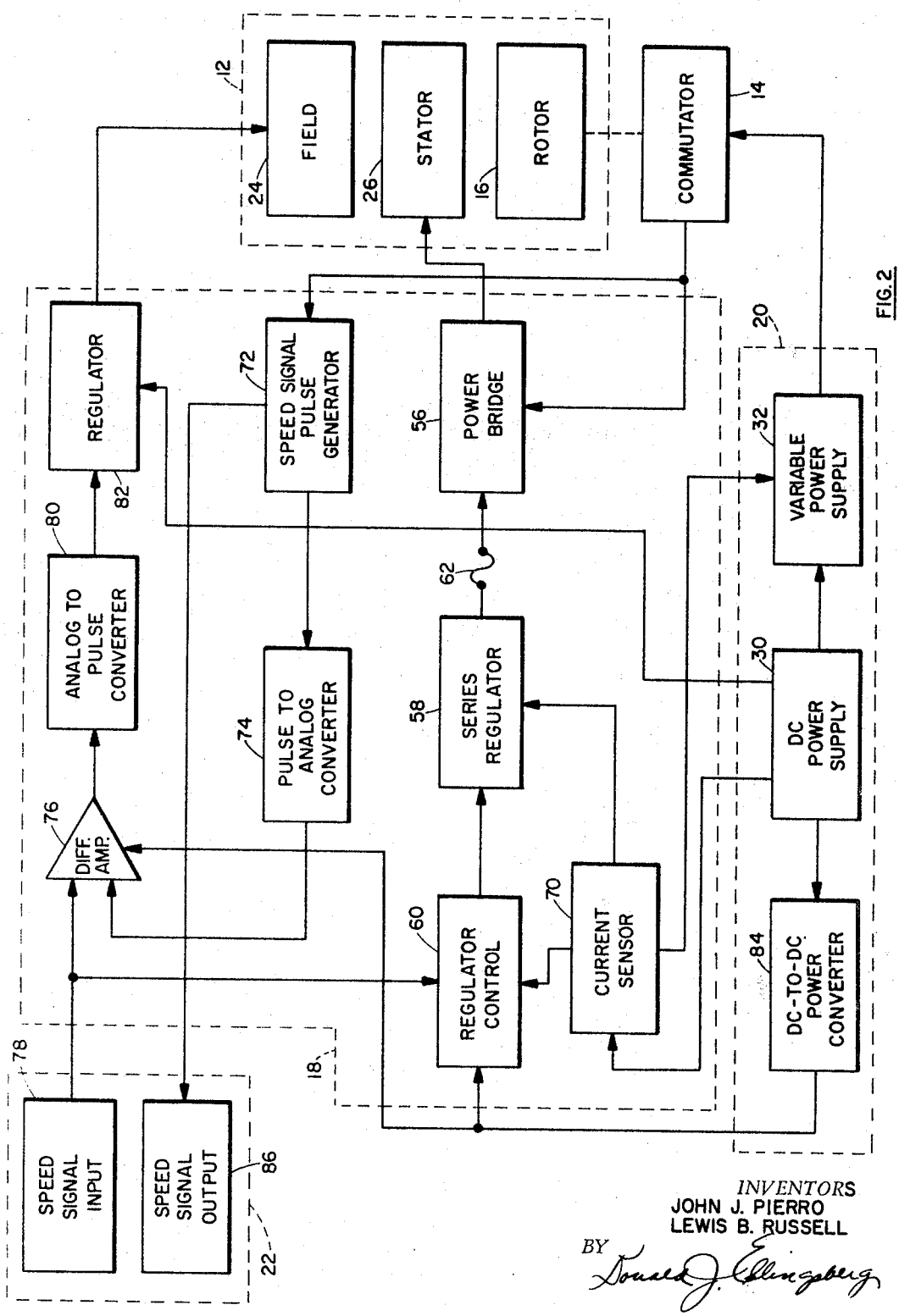
FIGURE 2 is a detailed block diagram of a specific embodiment of the speed control system of the invention cooperating with a dynamo-electric machine.

Referring to FIGURE 1, one embodiment of the speed control system 10 is shown cooperating with a dynamo-electric machine 12 which can be conventional. The dynamo-electric machine 12 can be similar to the dynamo-electric machine disclosed in U.S. Patent No. 3,321,652 and the linear synchronous motor disclosed in John J. Pierro's copending application Ser. No. 581,946, filed even date herewith; all assigned to the same assignee as the present invention. The speed control system 10 of the invention controls the field and stator energization of the dynamo-electric machine 12. A commutator means 14 cooperates with the dynamo-electric machine 12, particularly with the rotor 16 of the dynamo-electric machine, and functions to sense movement of the rotor, preferably the rotor speed and position. The commutator means 14 feeds the speed and position of the rotor 16 to a converter means 18 that is supplied with either polyphase electrical power or direct current electrical power from a power supply means 20. The converter means 18 responds to the output signal from the commutator means 14 which represents the speed and position of the rotor 16 and correlates this output signal with an input signal from a control signal means 22. The converter means 18 sets up a fixed field magnetic wave in the field 24 of the dynamo-electric machine 12. The converter means 18 further sets up a travelling magnetic wave in the stator 26 of the dynamo-electric machine 12 and adjusts the speed of the travelling magnetic wave in the stator 26 so that the velocity of the travelling magnetic wave substantially matches the velocity of the fixed field magnetic wave in the rotor 16. The converter means 18, dependent upon the input speed control signal from the control signal means 22 and responsive to the output signal from the commutator means 14, adjusts the frequency of the input voltage to the stator 26 so that the travelling magnetic wave and the field magnetic wave are stationary with respect to one another and separated by a predetermined displacement angle or phase angle designated delta ($\delta$). The dynamo-electric machine develops a desired torque or thrust because the stator and field magnetic waves attempt to align in accordance with known electromagnetic principles. When the travelling or stator magnetic wave leads the fixed or field magnetic wave, the desired force is developed between the stator 26 and the rotor 16 of the dynamo-electric machine 12.

Referring now to FIGURE 2, in a specific embodiment of the speed control system 10, the power supply means 20 includes a DC power source 30 which can be a conventional battery that is connected through a variable power supply 32 to the commutator 14. The variable power supply 32 is of the flux oscillator type and in the specific embodiment illustrated has an unregulated 2 kc. power output that provides the input power to the commutator 14. The output wave form from the variable power supply 32 is a square wave of approximately 6 volts peak-to-peak amplitude in the specific embodiment illustrated by FIGURE 2. The commutator 14 cooperates with the rotor 16 of the dynamo-electric machine 12 and is essentially a transformer that develops control signals representing rotor speed and position which are fed to the converter means 18.

One form of electromagnetic commutator 36 suitable for use with a dynamo-electric machine having a conventional rotor is shown by FIGURE 3. A primary field winding (not shown) is positioned in the commutator housing 38 as a stationary field winding. The primary field winding establishes a flux field across a working gap between similar commutator stator poles 40 and the commutator rotor 42 which is driven by a shaft 44 that is connected to and driven by the rotor 16 of the dynamo-electric machine 12 in the specific embodiment illustrated by FIGURE 2. As the commutator rotor 42 turns, similar secondary or stator coils 46 alternately see a train of alternating voltages of approximately 120 electrical degrees followed by 240 electrical degrees of nearly zero voltage. One voltage pulse train developed by the commutator 36 of FIGURE 3 is shown by FIGURE 4. The conduction period of 120 electrical degrees is established by an arc portion 50 of the commutator pole that is preferably formed from magnetic material. In the commutator 36 of FIGURE 3, a nonmagnetic portion 52 completes the commutator rotor 42. It is contemplated that any desired combination of magnetic and nonmagnetic arc portions can also be used. The magnetic material in arc portion 50 is slightly less, i.e., 115 electrical degrees, than the desired conduction period angle, e.g., 120 electrical degrees, to compensate for fringing effects. The transformer action provides equal performance at all speeds of the shaft including zero speed. This insures that a full self-starting capability for the dynamo-electrical machine is provided by the new and improved speed control system of the invention. The pulses that are induced in the stator coils 46 as the commutator rotor 42 rotates are fed to the converter means 18 of FIGURE 2.

Referring again to FIGURE 2, the pulses developed by the stator coils 46 of the commutator 14 are in the form of a modulated 2 kc. signal that is rectified and shaped by a conventional bridge driver circuit in power bridge 56. The bridge driver circuit develops pulse trains which resemble the modulation envelope. These pulse trains provide on-off signals for the power bridge 56.

The power bridge 56 receives input power from a series regulator 58 for the stator 26 of the dynamo-electric machine 12. The series regulator 58 is connected to the DC power supply 30. The function of the series regulator 58 is to regulate the power bridge 56 so that the power bridge will provide reduced voltage to the stator windings in stator 26 at decreased speeds of the dynamo-electric machine 12, thus maintaining high efficiency and preventing saturation and subsequent heating and burnout of the dynamo-electric machine. At zero speed, the output voltage of the series regulator 58 is set at the minimum level that is required to provide necessary starting torque for the dynamo-electric machine 12 when the field current is applied as described hereinafter. The voltage output from the series regulator 58 and thus power bridge 56 then increases linearly until full output is obtained. The series regulator 58 is of the conventional switching regulator type, and is driven by an analog-to-pulse converter. The analog-to-pulse converter (not shown) generates pulses at a rate that is proportional to the analog speed signal input from the regulator control circuit 60. The analog speed signal input from the control signal means 22 is introduced to the converter means 18 and received by the regulator control circuit 60. The regulator control circuit 60 senses the speed signal command and, when the null voltage point is reached, provides a discreet output signal that sets the series regulator 58 to required output. This permits the application of zero to full power to the stator windings of the stator 26 of the dynamo-electric machine 12. If the analog-to-pulse converter in the regulator control circuit 60 should fail, the series regulator 58 will not permanently cut-off power to the stator 26 of the dynamo-electric machine 12. Emergency operation of the dynamo-electric machine is therefore possible.

In the event of a short in the stator windings of the stator 26 of the dynamo-electric machine 12, a conventional fusible link 62, or a conventional circuit breaker or the like, will clear the fault.

A current sensor network 70 provides an analog signal proportional to the current demand by the series regulator 58 from the DC power source 30. The current sensor network 70 also provides a discreet output signal that indicates when the stator current fed to the stator windings in the stator 26 has reached a critical level. This signal reduces the output of the variable power supply 32 to the commutator 14 so that there is less power applied to the power bridge 56 when the power demand drops. This improves the overall efficiency of the dynamo-electric machine.

The modulated 2 kc. signal from the commutator 14 is also fed to a speed signal pulse generator 72 that generates a series of pulses which are proportional to the actual rotor speed. Since the pulse rate from a single commutator stator coil, such as commutator stator coil 46 as shown by FIGURE 3, is relatively low, the pulse rate is increased by taking signals from each of the commutator stator coils, e.g., the six similar stator coils 46 as shown by FIGURE 3, and generating an increased pulse rate in the speed signal pulse generator 72. The increased pulse rate is generated in the speed signal pulse generator 72 by developing spikes off the leading edges of the voltage pulses fed from the stator coils of the commutator 14. These spikes are then used to drive a monostable multivibrator in the speed signal pulse generator 72. The spikes will be 60 electrical degrees apart in the commutator as shown by FIGURE 3. Suitable diodes prevent cross-coupling between separate power bridge circuits. The diodes also allow dissipation of reactive power flow from the dynamo-electric machine 12. The output of the monostable multivibrator is a train of pulses of constant width and with a predetermined repetition rate, i.e., pulses per second.

The output from the monostable multivibrator of the speed signal pulse generator 72 is fed to a pulse-to-analog converter 74 which converts the proportional speed pulses from the speed signal pulse generator 72 to a DC voltage that is proportional to the shaft or rotor speed of the dynamoelectric machine 12. If the input signal to the pulse-to-analog converter 74 is low, the output drive to a differential amplifier 76 is low and the output from the differential amplifier 76 is correspondingly high. When the input is at a high state, the output from the pulse-to-analog converter 74 approaches its minimum output. However, since the switching action occurs continuously and compensating feedback is used, the output does not swing from full-on to full-off, but seeks a voltage level that is proportional to the input pulse rate from the speed signal pulse generator 72. Thus, the pulse-to-analog converter 74 provides a feedback input to the differential amplifier 76 in the converter means 18.

The differential amplifier 76 generates a DC error signal that is proportional to the difference between the analog speed command signal, i.e., the desired operating speed of the dynamo-electric machine 12, fed to the differential amplifier from the speed signal input 78 of the control signal means 22 and the analog rotor speed feedback signal fed to the differential amplifier from the pulse-to-analog converter 74. The DC error signal output of the differential amplifier 76 drives a field analog-to-pulse converter 80 whose output is a train of pulses having constant duration with a repetition rate that depends on the magnitude of the input to the analog-to-pulse converter. The pulse train output from the analog-to-pulse converter 80 is fed to a field current regulator 82 that adjusts the field energization of the dynamo-electric machine 12 so that a field magnetic wave developed by the field 24 is responsive to the DC error signal input from the converter means 18.

A DC-to-DC converter 84 provides direct current for the converter means 22 at voltages other than that provided by the main DC power supply 30. In the speed control system as illustrated by FIGURE 2, the control means 22 includes a speed signal output 86 that provides a speed readout for the system.

Operatively, a travelling or stator magnetic wave is produced by the electrical windings of the stator 26 in the dynamo-electric machine 12 when energized by the converter means 18 as described hereinbefore. The travelling stator magnetic field rotates at a speed that is proportional to the frequency of the applied voltage. The fixed or field magnetic wave is established by the energization of the field 24 and rotates at shaft or rotor speed. The force producing torque or thrust of the dynamo-electric machine 12 results from the attraction between the stator wave and the field wave in accordance with known electrical principles. Torque or thrust will exist as long as the travelling field and the fixed field rotate at exactly the same speed and with a finite displacement angle or phase angle delta ($\delta$) between the two. The commutator 14 senses the speed and position of the fixed field. The converter means 18 then utilizes this input as described hereinbefore to maintain the rotational speed of the travelling stator field exactly in step with the fixed rotor field and leading it at a constant displacement angle $\delta$. The converter means 18 receives the signal from the commutator 14 and automatically maintains an applied stator frequency $f_m$ that satisfies the relationship $f_m = kPN$, where $k$ is a constant of proportionality, P is the number of stator poles, and N is rotor speed. The dynamo-electric machine 12, therefore, develops a desired torque or thrust because the stator field and the rotor field attempt to align.

The travelling flux field or stator magnetic wave and the fixed flux field or field magnetic wave are shown by FIGURE 5 in a simplified sinusoidal form. The travelling flux field or stator wave 88 and the fixed flux field or field wave 90 combine electrically to form a resultant wave 92. The resultant mechanical force T between the rotor 16 and the stator 26 is proportional to the product of the amplitude of the resultant wave 92, which represents the resultant flux $\phi_R$, the mechanical force F of the field wave, and the sine of the displacement angle $\delta_{RF}$ between the resultant $\phi_R$ and the field force F which is essentially constant and slightly less than 90 electrical degrees (or any other selected electrical angle). This yields the relationship $$T = k\phi_R F \sin \delta_{RF}$$

This relationship results when the stator wave 88 and the field wave 90 are maintained substantially stationary with respect to one another.

The field mechanical force F and the resultant flux $\phi_R$ are directly related to the field voltage $E_g$ and the stator terminal voltage $V_t$. The displacement angle $\delta_{RF}$ is determined by the physical location of the commutator sensing axis with respect to the field pole axis which establishes the phase angle between the field voltage $E_g$ and the stator terminal voltage $V_t$ as shown by FIGURE 5. Thus, the displacement angle $\delta_{RF}$ is maintained substantially constant at any speed or frequency. This is true not only at all positive values or speed and frequency but also at the zero or starting condition of the dynamo-electric machine 12. At zero speed, the frequency is reduced to zero, i.e., essentially direct-current excitation. However, at zero speed the commutator 14 still senses the speed and position of the rotor 16 and there is a DC electrical power input to the frequency converter which distributes current to the various stator windings according to their resistance. This stator current distribution causes a magnetic wave along the air gap of the stator which is still approximately sinusoidal and displaced in space from the field magnetic wave by approximately 90 electrical degrees (or any other selected electrical angle). Thus, at zero speed, the stator wave and the field wave are again stationary with respect to each other and separated by a finite displacement. The conditions for positive torque or thrust are, therefore, satisfied and the desired starting force results.

The thrust or torque between the travelling and fixed magnetic fields is proportional to the strength of either field so that increasing either field increases the shaft or rotor torque. Speed control is also achieved by varying the strength of either magnetic field. Therefore, increasing either the voltage applied to the stator 26 of the dynamo-electric machine 12 or to the field 24 of the dynamo-electric machine will increase torque, cause acceleration and increase the rotor speed. Decreasing either will reduce torque, cause deceleration and reduce the speed. Extremely fine speed control of the rotor 16 and high efficiency for the dynamo-electric machine 12 can be achieved by varying both the stator voltage and the field current for an optimal operation at a desired speed or for rapid speed changes and speed reversals of the dynamo-electric machine.

As will be evidenced from the foregoing description, certain aspects of the invention are not limited to the particular details of construction as illustrated and it is contemplated that other modifications and applications will occur to those having skill in the art. It is, therefore, intended that the appended claims shall cover such modifications and applications that do not depart from the true spirit and scope of the invention.

We claim:
1. A speed control system for a dynamo-electric machine having field and stator windings, the speed control system comprising:
    (a) commutator means cooperating with the dynamo-electric machine and responsive to the movement of the rotor of the dynamo-electric machine and generating a corresponding output signal, and
    (b) converter means responsive to said commutator output signal and generating a first separate output signal to the field windings and a second separate output signal to the stator windings so that said first output signal develops a field magnetic wave and said second output signal develops a stator magnetic wave, said field magnetic wave and said stator magnetic wave separated by a predetermined and selectively variable displacement angle so that a controlled mechanical force is developed by the dynamo-electric machine.

2. A speed control system for a dynamo-electric machine having field and stator windings, the speed control system comprising:
    (a) control signal means responsive to a selective speed control input signal and generating a corresponding speed control output signal,
    (b) frequency converter means responsive to said speed control output signal and generating a corresponding first output signal,
    (c) power supply means responsive to said first output signal and generating a corresponding power output signal, and
    (d) commutator means cooperating with the dynamo-electric machine and responsive to said power output signal, said commutator means further responsive to the speed and position of the rotor of the dynamo-electric machine and generating an output signal,
    (e) said frequency converter means further responsive to said commutator means output signal and generating a second output signal to the field windings and a third output signal to the stator windings so that said second output signal develops a field magnetic wave and said third output signal develops a stator magnetic wave, said field magnetic wave and said stator magnetic wave separated by a selectively variable displacement angle so that a mechanical force developed by the dynamo-electric machine corresponds to the speed control input signal.

3. The speed control system of claim 2 in which said power supply means includes a variable power supply means responsive to said first output signal and generating said corresponding power output signal.

4. The speed control system of claim 3 in which said frequency converter means includes:
(a) field regulator means responsive to said speed control output signal and to said commutator means output signal and generating said second output signal, and
(b) a stator regulator means responsive to said speed control output signal and to said commutator means output signal and generating said third output signal.

5. The speed control system of claim 4 in which said stator regulator means is electrically connected to said power supply means.

6. The speed control system of claim 5 in which said frequency converter means includes current sensor means responsive to the electrical current fed to said stator regulator means from said power supply means and generating said first output signal.

References Cited

UNITED STATES PATENTS

| | | | |
|---|---|---|---|
| 1,939,432 | 12/1933 | Bedford | 318—177 XR |
| 1,971,188 | 8/1934 | Krämer | 318—138 |
| 1,976,463 | 10/1934 | Sabbah | 318—138 |
| 2,193,914 | 3/1940 | Alexanderson | 318—138 |
| 2,202,711 | 5/1940 | Morack | 318—138 |

ORIS L. RADER, *Primary Examiner.*

G. Z. RUBINSON, *Assistant Examiner.*

U.S. Cl. X.R.

318—338